(12) United States Patent
Kozloski et al.

(10) Patent No.: US 10,453,172 B2
(45) Date of Patent: Oct. 22, 2019

(54) SPARSE-DATA GENERATIVE MODEL FOR PSEUDO-PUPPET MEMORY RECAST

(71) Applicant: INTERNATIONAL BUSINESS MACHINES CORPORATION, Armonk, NY (US)

(72) Inventors: James R. Kozloski, New Fairfield, CT (US); Clifford A. Pickover, Yorktown Heights, NY (US); Valentina Salapura, Chappaqua, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

(21) Appl. No.: 15/478,811

(22) Filed: Apr. 4, 2017

(65) Prior Publication Data
US 2018/0286099 A1  Oct. 4, 2018

(51) Int. Cl.
| G06T 1/60 | (2006.01) |
| G06Q 10/00 | (2012.01) |
| G06T 13/00 | (2011.01) |
| G06F 3/01 | (2006.01) |
| G06K 9/00 | (2006.01) |

(52) U.S. Cl.
CPC ............... *G06T 1/60* (2013.01); *G06F 3/011* (2013.01); *G06K 9/00335* (2013.01); *G06Q 10/00* (2013.01); *G06T 13/00* (2013.01); *G06F 2203/011* (2013.01); *G06K 2009/00939* (2013.01)

(58) Field of Classification Search
CPC .......... G06T 13/40; G06T 1/60; G06F 3/002; G06K 9/00362
See application file for complete search history.

(56) References Cited

U.S. PATENT DOCUMENTS 6,425,764 B1  7/2002 Lamson
6,545,682 B1 *  4/2003 Ventrella ............... G06F 3/011
                                                    345/473
(Continued)

FOREIGN PATENT DOCUMENTS

WO  2015192117 A1  12/2015
WO  2016054042 A1  4/2016

OTHER PUBLICATIONS

Craig, AVATAR Therapy for Refractory Auditory Hallucinations, Brief Interventions for Psychosis: A Clinical Compendium. London: Springer; 2016. (Year: 2016).*
(Continued)

*Primary Examiner* — Mark K Zimmerman
*Assistant Examiner* — Phuc N Doan
(74) *Attorney, Agent, or Firm* — Cantor Colburn LLP; Rahan Uddin

(57) ABSTRACT

Technical features are described for generating a virtual reality (VR) memory recast. An example computer-implemented method includes selecting an event from a plurality of recorded events to animate. The method further includes generating an animation script based at least in part on captured information of the event. The method further includes editing the animation script by adding a simulated interaction in the animation script. The method further includes displaying a virtual reality representation of the animation script.

18 Claims, 7 Drawing Sheets

(56) References Cited

U.S. PATENT DOCUMENTS

| | | | |
|---|---|---|---|
| 6,896,655 B2 | 5/2005 | Patton et al. | |
| 9,106,812 B1* | 8/2015 | Price | H04N 1/212 |
| 2004/0164897 A1 | 8/2004 | Treadwell et al. | |
| 2005/0019734 A1 | 1/2005 | Peled | |
| 2005/0255437 A1 | 11/2005 | Knight | |
| 2008/0280276 A1 | 11/2008 | Raber et al. | |
| 2008/0319818 A1* | 12/2008 | Gurdin | G06Q 10/06314 |
| | | | 705/7.24 |
| 2009/0113298 A1* | 4/2009 | Jung | G06F 3/011 |
| | | | 715/700 |
| 2009/0157813 A1* | 6/2009 | Jung | A61B 5/04842 |
| | | | 709/204 |
| 2009/0171164 A1 | 7/2009 | Jung et al. | |
| 2010/0035692 A1* | 2/2010 | Reville | A63F 13/12 |
| | | | 463/42 |
| 2010/0302254 A1* | 12/2010 | Min | G06F 17/214 |
| | | | 345/473 |
| 2011/0018903 A1 | 1/2011 | Lapstun et al. | |
| 2012/0021840 A1* | 1/2012 | Johnson | A63F 13/60 |
| | | | 463/43 |
| 2013/0204675 A1* | 8/2013 | Dobell | G06Q 10/10 |
| | | | 705/7.42 |
| 2014/0207805 A1* | 7/2014 | Ebanks | G06F 16/5866 |
| | | | 707/755 |
| 2015/0223731 A1* | 8/2015 | Sahin | A61B 5/16 |
| | | | 600/301 |
| 2015/0278677 A1* | 10/2015 | Shuster | G06N 3/006 |
| | | | 706/12 |
| 2016/0027215 A1 | 1/2016 | Burns et al. | |
| 2016/0034152 A1* | 2/2016 | Wilson | G06F 3/04845 |
| | | | 715/835 |
| 2016/0077547 A1* | 3/2016 | Aimone | G06F 3/012 |
| | | | 345/8 |
| 2017/0148200 A1* | 5/2017 | Shoulson | G06T 13/40 |
| 2017/0221249 A1* | 8/2017 | Aguado | G06T 13/40 |

OTHER PUBLICATIONS

Ito, Recast and Elicitation: The Effectiveness of Corrective Feedback on Japanese Language Learners, University of Massachusetts Amherst, May 2015 (Year: 2015).*

Craig, AVATAR Therapy for Refractory Auditory Hallucinations, NCBI Bookshelf. A service of the National Library of Medicine, National Institutes of Health, Springer; 2016, URL:https://www.ncbi.nlm.nih.gov/books/NBK373172/ (Year: 2016).*

Leff et al., "Avatar Therapy", UCL Psychology and Language Sciences, Faculty of Brain Sciences, 2016, pp. 1-4.

* cited by examiner

SPARSE-DATA GENERATIVE MODEL FOR PSEUDO-PUPPET MEMORY RECAST

BACKGROUND

The present application relates to virtual environments, and more specifically relates to a platform for generating a virtual environment for a user by extracting sparse data based at least in part on the user's context, predicting future events, and generating synthetic elements for display in the virtual environment.

Modern computing and display technologies have facilitated the development of systems for so called "virtual reality" or "augmented reality" experiences, wherein digitally reproduced images or portions thereof are presented to a user such that they can be perceived as real. A virtual reality (VR) scenario typically involves presentation of digital or virtual image information without transparency to other actual real-world visual input. An augmented reality (AR) scenario typically involves presentation of digital or virtual image information as an augmentation to visualization of the actual world around the user. For example, an AR scene can allow a user of AR technology to see one or more virtual objects super-imposed on or amidst real world objects (e.g., a real-world park-like setting featuring people, trees, buildings in the background, etc.).

SUMMARY

According to one or more embodiments of the invention, a computer implemented method for generating a virtual reality (VR) memory recast includes selecting an event from a plurality of recorded events to animate. The method further includes generating an animation script based at least in part on captured information of the event. The method further includes editing the animation script by adding a simulated interaction in the animation script. The method further includes displaying a virtual reality representation of the animation script.

According to one or more embodiments of the invention, a virtual reality system includes an events repository that includes a captured information corresponding to a plurality of recorded events. The virtual reality system further includes an animator. The animator selects an event from the events repository for animating. The animator further generates an animation script based at least in part on captured information of the event. The virtual reality system further includes a predictor that simulates an interaction to be added to the animation script. The animator further edits the animation script by adding the simulated interaction. The virtual reality system further includes a virtual world presenter that displays a virtual reality representation of the animation script.

According to one or more embodiments of the invention, a computer program product for a virtual reality system includes a computer readable storage medium having program instructions embodied therewith. The program instructions are executable by a processing circuit to cause the processing circuit to select an event from an events repository for animating. The program instructions also cause the processing circuit to generate an animation script based at least in part on captured information of the event. The program instructions also cause the processing circuit to simulate an interaction to be added to the animation script, and edit the animation script by adding the simulated interaction. The program instructions also cause the processing circuit to display a virtual reality representation of the animation script.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
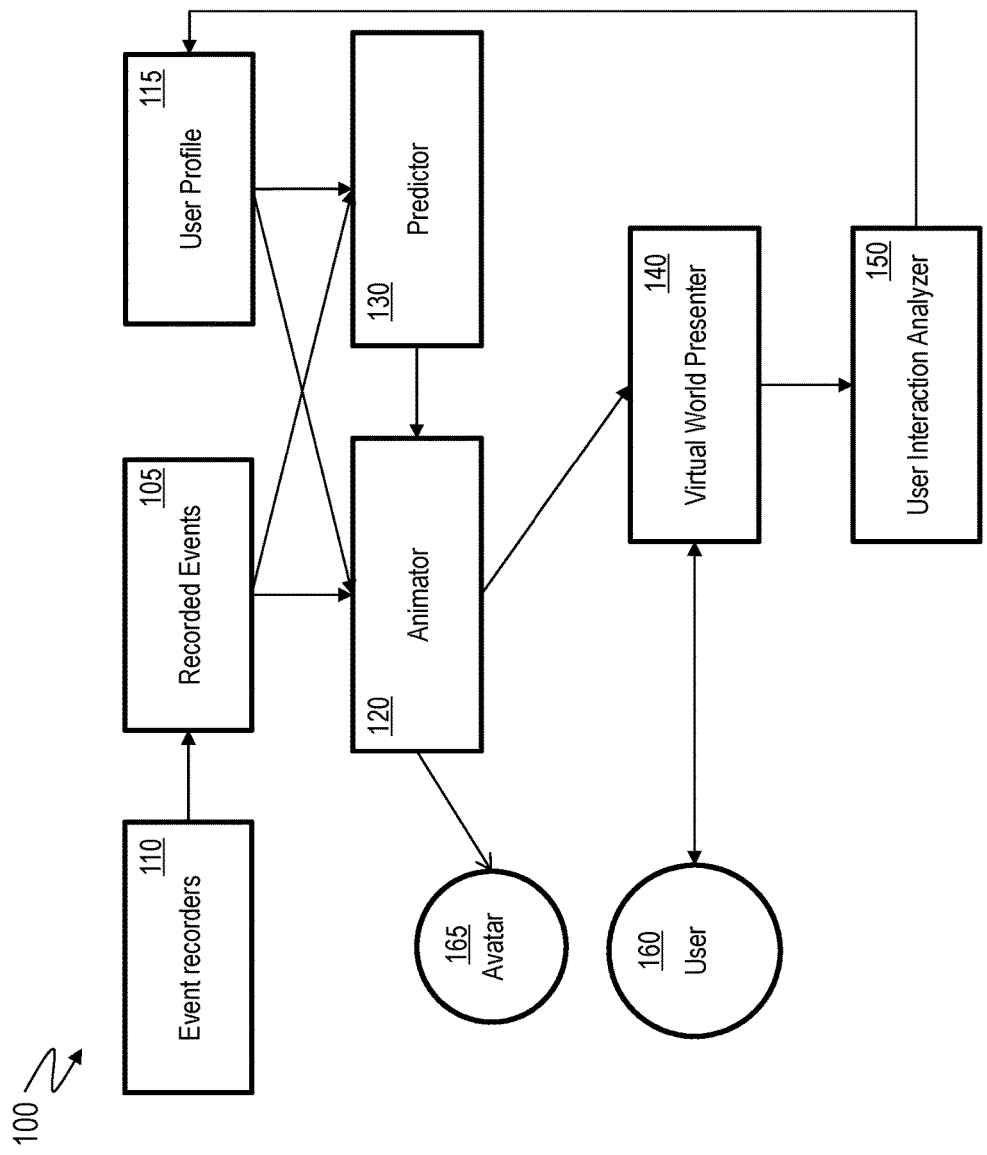
FIG. 1 illustrates an example virtual reality system according to one or more embodiments of the invention.

The description herein uses the phrase "virtual reality" to encompass various forms of computer generated content, such as fully immersive virtual reality, augmented reality, 360-degree video, and the like. For example, fully immersive virtual reality can include a virtual world (in other words, a computer-generated world) that a user can interact with, for example using a virtual reality headset, or any other such device. The virtual world in this case may or may not map to a real world, for example, the user's home, office, appearance, in the real world may (or may not) look the same in the virtual world. In augmented reality, for example, virtual objects are inserted into a real world view. For instance, in the above example, the user's office in the virtual world can look the same as the real world, except that virtual objects are inserted in the virtual world, which can be interactive through the virtual reality headset etc. The 360-degree video captures the entire scene around the camera, giving the user the feeling of actually being in place of the camera, such as the jungle or on stage at a concert. Typically, in the 360-degree video, while the user can look around, it does not offer the same level of interactivity as a fully immersive virtual world, or augmented reality.

Described here are technical features for a virtual reality system. The virtual reality system, using such technical features, facilitates capturing or receiving sparse information about a user, such as one or more events from a predetermined duration, and re-creating the events in a virtual world presented by the virtual reality system. Further, the virtual reality system implements technical features to quantify emotional levels of the user during the events, as well as during interactions with the virtual world presentation(s). The virtual reality system, in one or more examples, use historic quantified emotional levels to automatically generate new virtual world presentations, such as by editing the look and feel, and/or sequence of events. Additional technical features are also described further, such as diagnosing cognitive health of the user based at least in part on the interactions with the virtual world presentation(s). The technical features described herein, thus, improve virtual reality systems, for example, by automatically generating virtual world presentations based at least in part on sparse information about the user, and further diagnosing cognitive health of the user based at least in part on interactions with such presentations. Further yet, the technical features facilitate the virtual reality system to generate a future-cast virtual world presentation that simulates one or more scenarios for the user to view/participate. The future-cast virtual world presentation is generated, for example, based at least in part on the sparse information about the user and the historic emotional level data. As such the technical solutions are rooted in and/or tied to computer technology in order to overcome a problem specifically arising in the realm of computers, specifically virtual reality systems.

FIG. 1 illustrates an example virtual reality system 100, according to one or more embodiments. The virtual reality system 100 includes, among other components, one or more event recorders 110, an animator 120, a predictor 130, a virtual world presenter 140, and a user interaction analyzer 150. Each of these components can be a separate device in communication with each other. Alternatively, or in addition, one or more of these components can be part of a single device. In one or more examples, each of the components is a processing circuit, including hardware, which can execute computer readable instructions. Alternatively, or in addition, each of the components can include electronic circuits such as application specific integrated circuits (ASICs), field programmable gate arrays (FPGAs), and the like.

Figure 2:
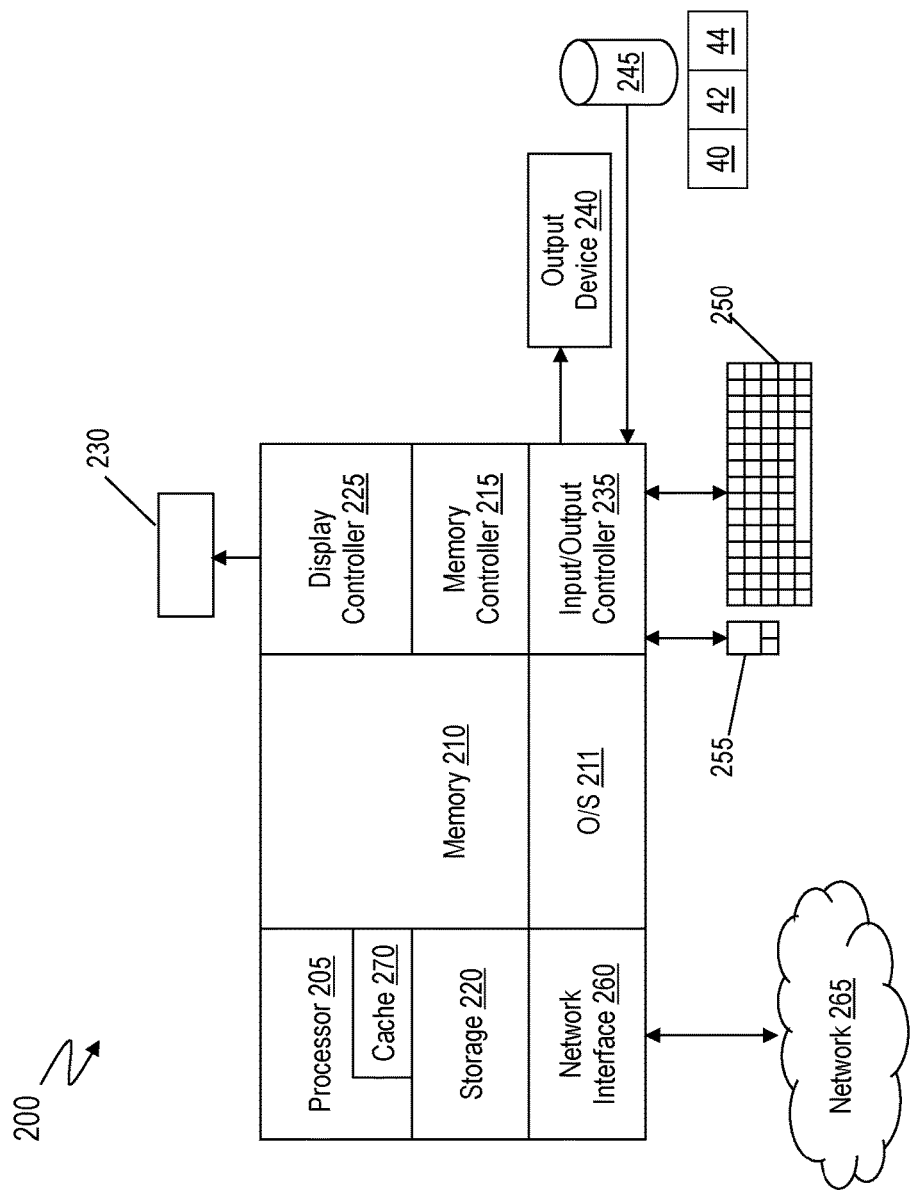
FIG. 2 illustrates an example device that implements the features of a virtual reality system, according to one or more embodiments of the invention.

FIG. 2 illustrates an example device 200 that implements the features of the virtual reality system 100, according to one or more embodiments. For example, the device 200 can be a communication apparatus, such as a computer. For example, the device 200 can be a desktop computer, a tablet computer, a laptop computer, a phone, such as a smartphone, a server computer, or any other device that communicates via a network 265. The device 200 includes hardware, such as electronic circuitry.

The device 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 can include, for example, battery sensors, position sensors (gyroscope 40, accelerometer 42, GPS 44), indicator/identification lights and the like. Input devices such as a conventional keyboard 250 and mouse 255 can be coupled to the I/O controller 235. Alternatively, or in addition, the I/O controller 235 can receive input from, and provide output to game controllers, joysticks, or any other type of input device. In one or more examples, the input devices provide tactile and/or haptic feedback to the user. The I/O controller 235 can be, for example, one or more buses or other wired or wireless connections, as are known in the art. The I/O controller 235 can have additional elements, which are omitted for simplicity, such as controllers, buffers (caches), drivers, repeaters, and receivers, to enable communications.

The I/O devices 240, 245 can further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 can be a custom made or commercially available processor, a central processing unit (CPU), an auxiliary processor among several processors associated with the system 100, a semiconductor based microprocessor (in the form of a microchip or chip set), a macroprocessor, or other device for executing instructions. The processor 205 includes a cache 270, which can include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 can be organized as a hierarchy of more cache levels (L1, L2, and so on.).

The memory 210 can include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 can incorporate electronic, magnetic, optical, or other types of storage media. Note that the memory 210 can have a distributed architecture, where various components are situated remote from one another but can be accessed by the processor 205.

The instructions in memory 210 can include one or more separate programs, each of which comprises an ordered listing of executable instructions for implementing logical functions. In the example of FIG. 2, the instructions in the memory 210 include a suitable operating system (OS) 211. The operating system 211 essentially can control the execution of other computer programs and provides scheduling, input-output control, file and data management, memory management, and communication control and related services.

Additional data, including, for example, instructions for the processor 205 or other retrievable information, can be stored in storage 220, which can be a storage device such as a hard disk drive or solid state drive. The stored instructions in memory 210 or in storage 220 can include those enabling the processor to execute one or more aspects of the systems and methods described herein.

The device 200 can further include a display controller 225 coupled to a user interface or display 230. In some embodiments, the display 230 can be an LCD screen. In other embodiments, the display 230 can include a plurality of LED status lights. Alternatively, or in addition, the display 230 can be a virtual reality headset, such as a head-mounted display (HMD).

In some embodiments, the device 200 can further include a network interface 260 for coupling to a network 265. The network 265 can be an IP-based network for communication between the device 200 and an external server, client and the like via a broadband connection. In an embodiment, the network 265 can be a satellite network. The network 265 transmits and receives data between the device 200 and external systems. In some embodiments, the network 265 can be a managed IP network administered by a service provider. The network 265 can be implemented in a wireless fashion, for example, using wireless protocols and technologies, such as WiFi, WiMax, satellite, or any other. The network 265 can also be a packet-switched network such as a local area network, wide area network, metropolitan area network, the Internet, or other similar type of network environment. The network 265 can be a fixed wireless network, a wireless local area network (LAN), a wireless wide area network (WAN) a personal area network (PAN), a virtual private network (VPN), intranet or other suitable network system and can include equipment for receiving and transmitting signals.

Referring back to FIG. 1, in one or more examples, the virtual reality system 100 facilitates generating and presenting a virtual world or massively multiplayer online world (MMOW) to a user 160. In one or more examples, the MMOW is a computer-based simulated environment populated by many users who can create a personal avatar, and simultaneously and independently explore the virtual world, participate in its activities and communicate with others. The avatars can be textual, two or three-dimensional graphical representations, or live video avatars with auditory and touch sensations. In general, virtual worlds allow for multiple users. In one or more embodiments described herein, one avatar represents the user 160, and other avatars are artificial intelligence (AI) agents or props, not guided by real people.

In one or more examples, the user 160 accesses the computer-simulated world, which is a virtual world, via the virtual world presenter 140. The virtual world presents perceptual stimuli to the user 160, who in turn can manipulate elements of the virtual world and thus experience a degree of presence. Such modeled virtual worlds and their rules can draw from the reality or fantasy worlds. Example rules are gravity, topography, locomotion, real-time actions, and communication. Communication between users can range from text, graphical icons, visual gesture, sound, touch, voice command, and balance senses.

In one or more examples, the virtual world that the virtual world presenter 140 presents is automatically generated by the virtual reality system 100. For example, the animator 120 generates a virtual reality representation (a.k.a. life rollback puppet show or memory recast). For example, the animator 120 generates the avatars, including an avatar 165 for the user 160. In one or more examples, the avatar 165 for the user 160 is based at least in part on a user profile 115 for the user 160. The user profile 115 can include information about the user 160, such as age, gender, name, picture, and other demographic information. The user profile 115 can further include information such as whether the user 160 is affected by a mental health and/or cognitive condition, such as autism, pre-Alzheimer's, schizophrenia, and the like.

In one or more examples, the user profile 115 is used to identify one or more cohorts of which the user 160 is a part of. For example, if the user 160 is being treated for pre-Alzheimer's, she or he can be identified as part of a cohort of users that all are undergoing similar treatment.

In one or more examples, the appearance of the avatar is based at least in part on the information in the user profile 115. The avatar 165 is an image that is used to represent the user 160 in the virtual world. The avatar 165 can be textual, two or three-dimensional graphic representation, or live video avatars with auditory and touch sensations.

Further, the animator 120 generates animation sequence using the avatar 165 of the user 160. The animation sequence can be a life rollback puppet show or memory recast. For example, the animation sequence depicts one or more events that have occurred in the user's life. In one or more examples, the animator 120 accesses the information about the events from a repository of recorded events 105.

For example, the event recorders 110 record and store one or more events occurring in the user's 160 life in the recorded events 105. The event can be an action being taken by the user 160 over the course of a predetermined duration (for example, day) or at a predetermined time-interval (for example, between 1 PM to 2 PM of Jan. 31, 2017). The event can be identified to the event recorders 110 in advance. For example, the user 160 can have a meeting scheduled between 1 PM to 2 PM of Jan. 31, 2017. The user 160 can identify the meeting as an event to be recorded.

Alternatively, or in addition, the event recorders 110 automatically identify the events that are to be recorded by accessing an electronic calendar for the user 160. For example, the event recorders 110 can access a LOTUS™, OUTLOOK™, GOOGLE CALENDAR™, or any other electronic calendar that the user 160 can identify in the user profile 115. Based at least in part on the records in the calendar, the event recorders 110 can initiate recording an event in the recorded events 105. Further, in one or more examples, the event recorders 110 can identify an event to be recorded based at least in part on one or more attribute associated with the calendar record, such as, a location, a time, an attendee, or any other attribute of the calendar record.

The event recorders 110 capture different types of information for an event. The event recorders 110 include information capturing devices such as a camera, a microphone, and the like. The information capturing devices record content of the events, such as images and audio. In one or more examples, the event recorders 110 can convert the audio, specifically speech in the audio to text, and record the text in the recorded events 105.

Further, the event recorders 110 include sensors that capture and record supplemental information at the time of the event. For example, the event recorders 110 can include a thermometer that measures an ambient temperature and a temperature of the user 160 during the event. The event recorders 110 further includes a heartbeat monitor that monitors the pulse or the heartbeat of the user 160 during the event. Further, the event recorders 110 can include geolocation devices that capture a location, orientation, and other such information of the user 160 during the event. It should be noted that the above are just a few examples of the event recorders 110, and that the event recorders can include additional or different biometric devices that capture one or more biometric signals of the user 160 during the events in other examples. In addition, the event recorders 110 include one or more communication devices that monitor and capture information such as chats, emails, social media posts, electronic calendar records, smartphone information, smart devices information, and other such electronic information for the user 160 during the event.

In one or more examples, the event recorders 110 continuously record the information, such as the above. The virtual reality system 100 provides a user interface for the user 160, or another person, such as a medical professional, or any other user to scan the recorded information and identify events that are to be stored as the recorded events 105. In one or more examples, the selected information is stored as the recorded events 105 and the rest of the information is deleted.

In one or more examples, the animator 120 or the event recorders 110 identifies the recorded events 105 from the continuously recorded data based at least in part on the one or more attributes of the recorded data. For example, the recorded information is scanned automatically at a predetermined frequency, and specific actions of the user are stored as the recorded events 105 in response to the user's 160 heartrate being at or above a predetermined threshold. Alternatively, or in addition, the information corresponding to the user 160 being at a location, or within a predetermined vicinity of a location is stored as the recorded events. Alternatively, or in addition, the information corresponding to a combination of the user's biometric signals, such as heartrate, and thermometer, satisfying predetermined criteria can be used as a condition to identify the recorded events 105.

In one or more examples, a value of an attribute crossing a predetermined threshold may trigger the event recorders 110 to identify and record an event. For example, in response to the attribute reaching or crossing the predetermined threshold triggers continuous recording of data, such that the continuously recorded data represents a "look-back" from the attribute or event, and can be stored as a permanent record of user recordings that led up to the event. For example, using a circular buffer, these data stored based on the attribute may accrue, while other irrelevant data is overwritten or deleted from the buffer. Also, data following the attribute event may also be stored, indicating what happened after the criterion attribute or event had occurred.

The access to the recorded events 105 is controlled (including control during the user's 160 life or after death). For example, the user 160 can provide instructions as to which of the recorded events can be shared with others during his/her life or after his/her death.

Figure 3:
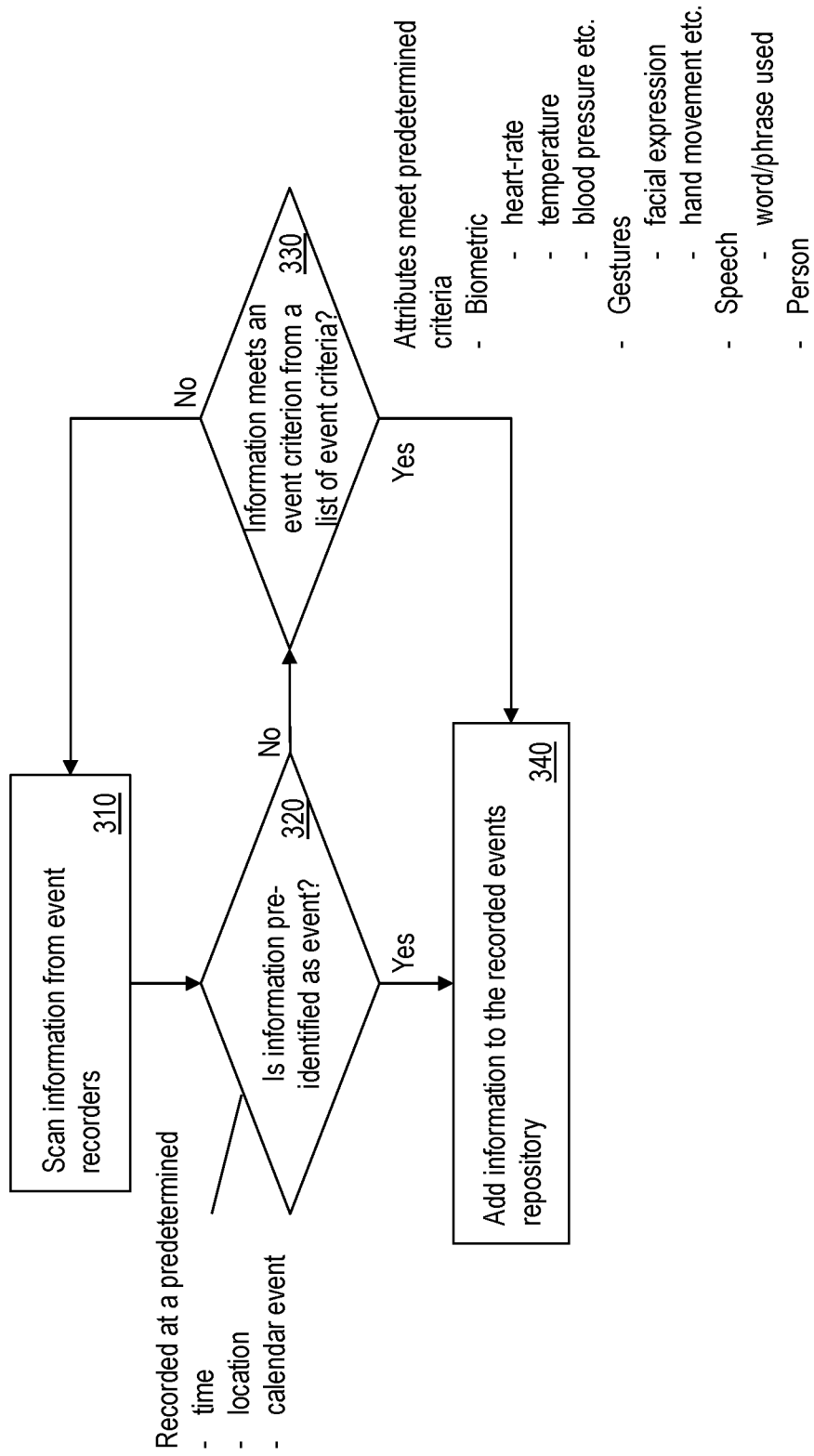
FIG. 3 illustrates a flowchart for an example method for identifying and storing sparse information, according to one or more embodiments of the invention.

FIG. 3 illustrates a flowchart for an example method for identifying and storing sparse information in the recorded events 105, according to one or more embodiments. The method can be executed by the virtual reality system 100, or any other system that has access to the information captured by the event recorders 110. For example, the event recorders 110 include a filter that executes the method. The filter scans the information that is captured by the event recorders 110, as shown at 310. The filter checks if the information is pre-identified as an event to be recorded, as shown at 320. For example, if the information is collected at a predetermined time, at a predetermined location, or is associated with a predetermined calendar event, or the like, the filter records the information as part of a recorded event 105, as shown at 340.

If the information is not for a pre-identified event, the filter determines if the information includes attributes that meet a predetermined criteria from a list of event criteria, as shown at 330. For example, the filter compares one or more biometric signals of the user 160, such as heartrate, temperature, blood-pressure, and so on, or a combination thereof, with corresponding predetermined thresholds. If the thresholds are met, the filter can store the information as an event in the recorded events repository 105, as shown at 340. Alternatively, or in addition, the predetermined criteria can be based at least in part on a gesture performed by the user 160. For example, if the information captures a predetermined facial expression or a predetermined hand movement, or any other gesture being performed by the user 160, the filter stores the information as a recorded event, as shown at 340. Alternatively, or in addition, the filter can identify an event to be recorded based at least in part on speech, such as a predetermined word or phrase used by the user 160.

In yet another example, the filter can use an identity of another person that the user 160 interacts with to determine if the captured information is to be stored as a recorded event. For example, the predetermined list of users can include the user's 160 wife, siblings, colleague, client, doctor, parent, or any other person. The filter can use facial recognition, voice recognition, or any other technique to identify that the user 160 is interacting with another user from a predetermined list of users. In one or more examples, the filter can use facial recognition, voice recognition, or any other technique to identify that the user 160 is interacting with another user from the predetermined list of users.

The filter, thus, selects only specific information from the captured information as the recorded events 105. The recorded events 105 thus include sparse information about actions or interactions in which the user 160 was involved. The recorded events 105 are further used by the virtual reality system 100 to generate animation sequences for playback for the user 160.

For example, the user 160 can desire to review actions and related events that have recently transpired, for example, over the course of a day, week, or any other duration. The event recorders 110 in combination with the filter, acquires the sparse information relating to the user's life events for the period of time in the past (e.g. previous 24 hours). Further, the animator 120 converts the sparse information to an animated virtual reality representation, for example avatar 165 of the user 160 and avatars of other people, such as colleagues interacting. As described herein, the sparse information includes the selected information from the user's day that is retrievable to reconstruct the events such as, interactions, meetings, emotions, movements, etc.

Figure 4:
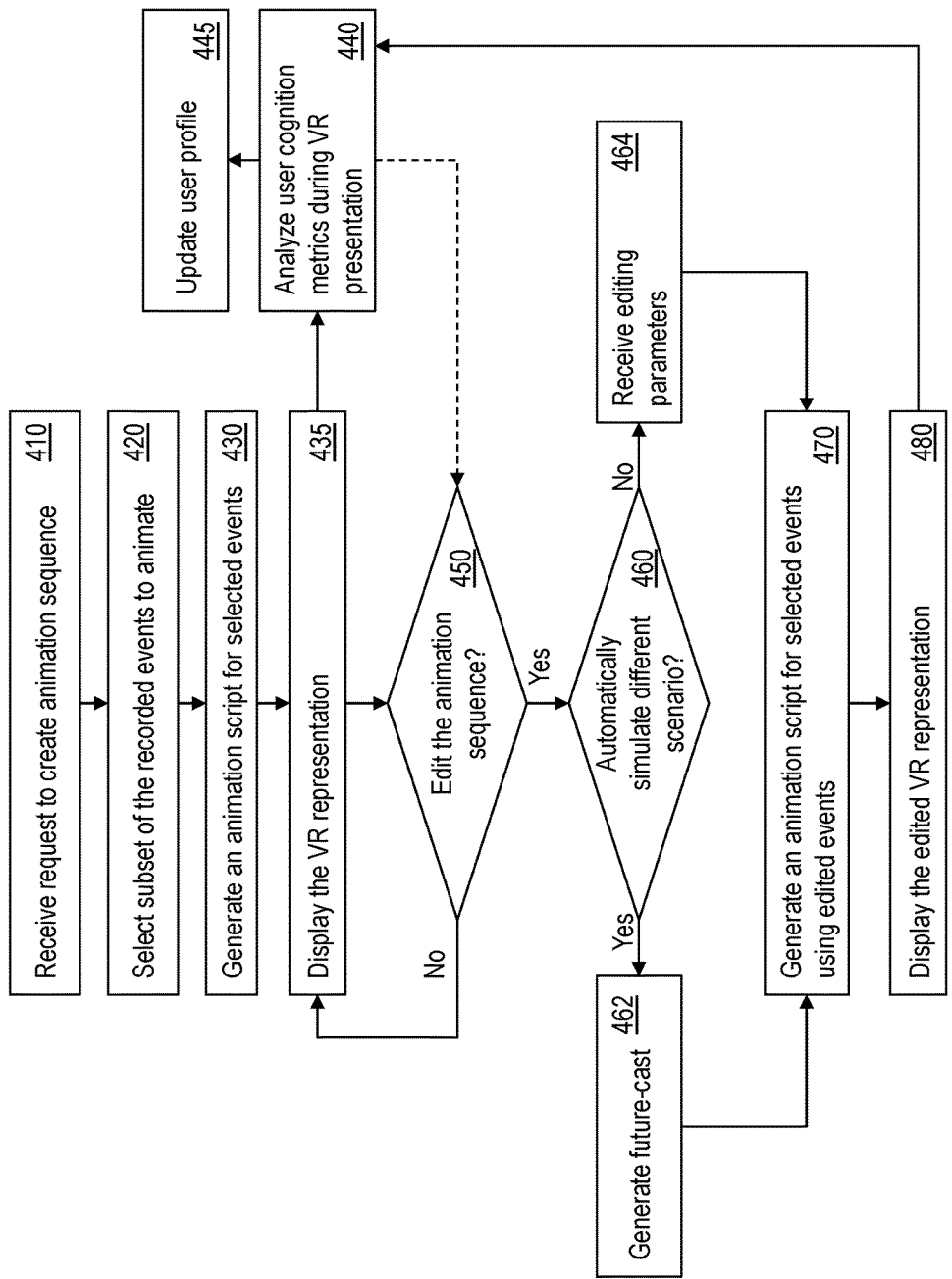
FIG. 4 illustrates a flowchart of an example method for generating an animation sequence based at least in part on recorded events according to one or more embodiments of the invention.

FIG. 4 illustrates a flowchart of an example method for generating an animation sequence based at least in part on the recorded events 105, according to one or more embodiments. In one or more examples, the animator 120 generates the animation sequence using a generative model. For example, the animator 120 receives a request for generating the animation sequence, as shown at 410. The request can be received from the user 160, via a user-interface of the virtual reality system 100.

The animator 120 selects a subset of the recorded events 105 to animate, as shown at 420. The animator 120 can select the subset of events based at least in part on one or more parameters included in the request. For example, the request can indicate a type of animation sequence to generate. For example, the user 160 wishes to view an animation sequence as a 'memory aid', or a 'simulation', or any other type of animation. In one or more examples, based at least in part on the selected type, the animator selects the events to animate. Alternatively, or in addition, the request can identify one or more events to be animated. For example, the request can include identifier(s) of the event(s) that the user 160 selects for animating. It should be noted that a single 'event', as used herein, includes multiple actions/interactions. For example, an event can include a meeting, a conversation, a coaching session, a sport event, an exercise routine, an interview, or any other such incident.

Alternatively, or in addition, the request can provide a selection criteria, such as one or more biometric values, location, calendar event, user-identifiers, or any other such criteria for selecting the events for animating. For example, the user 160 can use the animation sequence for career coaching, or any other behavior correction. The virtual reality system 100 can be used for self-help, therapy, learning, recollection and drilling, reliving useful or happy experiences, etc. Accordingly, the virtual reality system 100 identifies the events where the user 160 was reacting emotionally, negatively, or according to a predetermined state that can be identified based at least in part on a corresponding set of biometric values. As described herein, a third party's access, such as the coach's access to the recorded events 105 can be limited by the user 160.

In one or more examples, the events can be identified based at least in part on the biometric values, gestures, words used, or the like. For example, the selection criteria in the received request can identify the factors and values with which to compare the data from the recorded events 105. The factors can be specific to the user 160, based at least in part on the user profile 115. In one or more examples, the virtual reality system 100 can be used as part of a coaching session in which, a psychiatrist, a psychologist, or any other cognitive health professional provides the selection criteria to be used.

For example, the selection criteria can specify selecting events in which the user's heartrate was above a specific value, for example 120 bpm. Alternatively, or in addition, the selection criteria can specify selecting events in which the user 160 was interacting with a specific other user, identified by a user-identifier. Alternatively, or in addition, the selection criteria can specify selecting events in which the user 160 was involved in a particular type of activity, such as an interview, a work related meeting, an exercise session, or any other such activity, which is identified based at least in part on the user's electronic calendar.

In one or more examples, a user interface can be provided to the user 160 (or a caregiver) to specify a segment in time for memory recast, a view perspective, degree of realism, a graphical feature in the virtual world—and/or a user characteristic, a user disability, user concern, or user personality type, etc. Based at least in part on the selections from the user interface, the virtual reality system 100 selects the one or more events for animating and playback as the memory recast.

Further, the animator 120 generates an animation script for the selected events, as shown at 430. The generated animation script is further played back by the virtual reality system 100 via the virtual world presenter 140, as shown at 440. For example, the virtual world presenter 140 can present the generated animation sequence in an interactive virtual world via an HMD or any other type of I/O unit of the virtual reality system 100. The animation script depicts the actions/interactions from the selected events via the virtual world presenter 140. The animation sequence can be displayed in multiple views. For example, the animation sequence can playback as if the user 160 is looking at himself/herself or is seeing through his/her own eyes.

In one or more examples, the animator 120 generates a virtual reality representation (memory recast) for each event from the recorded events 105. The virtual world presenter 140 presents a list of the generated memory recasts to the user 160 for selection of one or more of the memory recasts. For example, the generated memory recasts are displayed to the user sorted by an estimated emotional level of user (e.g. from user's pulse or facial expression or word choices), estimated emotional value to a user, estimated educational value to a user, a configurable the setting from the user, the age of the events, the people interacted with in the event, or any other such attributes.

Figure 5:
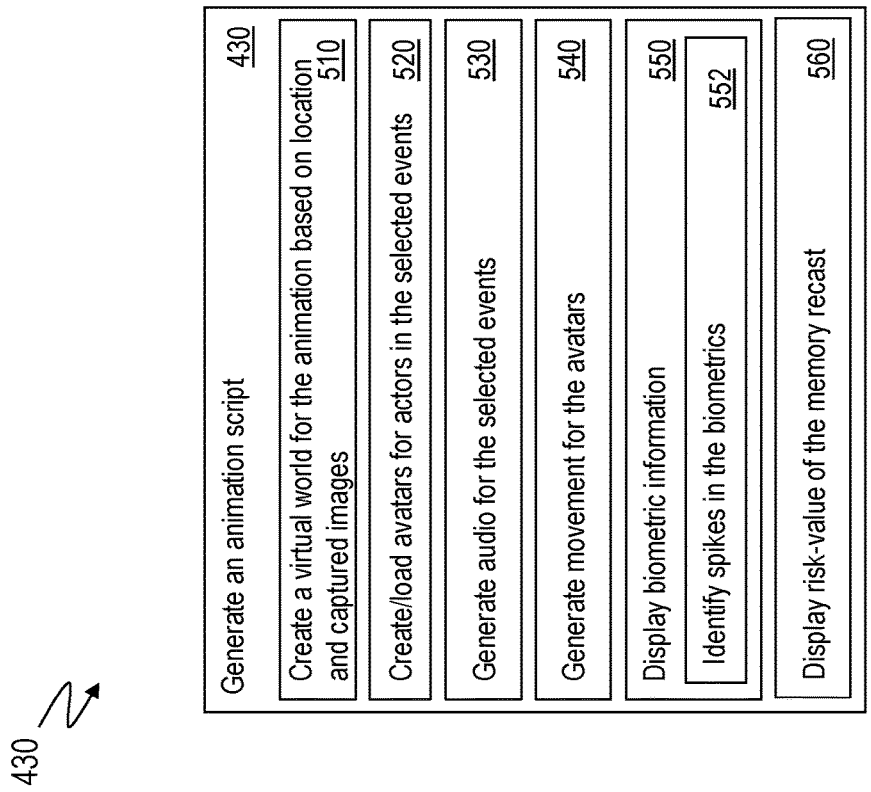
FIG. 5 illustrates a flowchart for generating a memory recast according to one or more embodiments of the invention.

FIG. 5 illustrates a flowchart for generating a memory recast, or an animation script for the memory recast, according to one or more embodiments. The animator 120 creates a virtual world for the animation based at least in part on location and captured images for the events being animated, as shown at 510. For example, the animator creates one or more computer-generated surfaces and objects, using a polygon mesh, vector graphics, or any other computer graphics techniques. The generated virtual world can depict the real world environment at the location of the events. For example, the animator 120 can access the images associated with the event, as captured by the event recorders 110. The virtual world can be a representation of the user's place of work or home, or a virtual world generation engine of the animator 120 generates virtual worlds from images collected from various sources, including images supplied by a user, therapist, or crowd-sourced images.

The animator 120 further creates and/or loads avatars of the one or more actors involved in the event, as shown at 520. The animator 120 can create the avatars from the captured images, and/or from user profiles of the actors. In one or more examples, a pseudo-sentient puppeteer (e.g. an artificial intelligence agent) can be used to control the user avatar 165 or other avatars to emphasize points, increase or decrease realism, explore alternate scenarios, help provide a context for a person with pre-Alzheimer's or autism, etc. Further, the degree of realism for the avatar representation can be controlled, or the viewpoints can be controlled, by any of: the user, a therapist, a teacher, a manager, a healthcare professional, etc.

The animator 120 further generates audio for the selected events, as shown at 530. The audio can be generated by using the captured audio from the event recorders 110. Alternatively, or in addition, the audio is generated by converting text to speech. The audio and/or the text used to generate the animation audio is accessed from the recorded events 105. Further, the animator 120 generates movement for the avatars, as shown at 540. The movement indicates the positions, and/or gestures for the one or more avatars in the animation sequence. In one or more examples, the movement can be provided as a set of coordinates for the one or more avatars, or parts of the avatars to move to. Alternatively, or in addition, the movements can be provided in the form of vector calculations for the avatars and/or parts.

The animation script thus generated specifies a virtual world with avatars, surroundings, sounds, and movement for the avatars, and/or other objects in the virtual world. The virtual world presenter 140 facilitates the user 160 to view the animation sequence by executing or playing back the generated animation script.

In one or more examples, the virtual world is an interactive three-dimensional virtual reality environment utilizing computer generated graphics, images imported from photographs, and/or video for sensory stimulation. Immersion can be achieved with goggles, a head-mounted-display, or other form of visual stimulation, such as surround projection screens or monitors or devices that permit the user 160 to have a virtual experience. It includes the use of voice, music, and sound and other forms of physiological stimulation and feedback. In one or more examples, body sensors and devices such as a hand-held grip are used for the user 160 to interact with objects and navigate within the virtual environment.

Further, in one or more examples, the virtual world is superimposed or combined with aspects of the real world. For example, consider an HMD device that renders a virtual reality environment in which areas masked out so that real world objects such as computer monitors, doors, people, faces, and the like appear visible to the user 160, such as when the user 160 is with another person in his office, or near his real car, and wishes to see them in the virtual world. The HMD device can include a sensor package to support application of surface reconstruction techniques to dynamically detect edges and surfaces of the real world objects and keep objects visible on the display as the user 160 changes position or head pose or when the real world objects move or their positions are changed. The HMD device further provides controls to enable the user 160 to select which real world objects are visible in the virtual reality environment.

In one or more examples, the virtual world presenter 140 displays biometric information of the user 160, as shown at 550. For example, the biometric information displayed includes the data values that were collected as the event was captured and recorded. Alternatively, or in addition, the biometric information displayed includes biometric values of the user 160 as the user 160 is watching the animation sequence. Further yet, in one or more examples, the virtual world presenter 140 highlights spikes in the biometric values, as shown at 552. For example, if a biometric measurement for the user 160 goes above (or below) a predetermined threshold, the virtual world presenter 140 can change the color of the displayed value, and/or provide an audible sound, or any other indication in response.

In one or more examples, the virtual world presenter 140 displays a risk value associated with the memory recast being presented, as shown at 560. The risk-value identifies a sparsity of the information that is used for generating the animation sequence for the memory recast. For example, the virtual reality system 100 computes the risk-value based at least in part on a ratio of a number of frames of animation that are simulated by the virtual reality system 100 based at least in part on a predictive model (e.g. when captured information for the event is sparse), and a number of frames generated according to the captured information. The displayed risk-value illustrates to the user 160 how much the memory recast is "representational" rather than correct on specifics.

Referring back to FIG. 4, the animator 120 can receive a request to edit the animation sequence, as shown at 450. In one or more examples, the request can be received while the virtual world presenter 140 is presenting the animation sequence. Alternatively, or in addition, the request can be received after the animation sequence has completed playback. The request can be provided by the user 160, or by a coach or any other person watching the animation sequence in conjunction with the user 160. For example, the virtual world presenter 140 can facilitate playback of the animation sequence to multiple devices in conjunction. Alternatively, or in addition, the virtual world presenter 140 can facilitate input from multiple control units. Alternatively, or in addition, the request can be automatically generated.

In one or more examples, the memory recast can be stored for another user, such as the coach, to view. The access to the memory recast can also be controlled including control during a person's life or after death. For example, the user 160 can provide instructions as to how much of a recast can be shared with others during his/her life or after his/her death.

For example, the request for editing the animation sequence can be generated based at least in part on the biometric values of the user 160 while the user 160 is watching the animation. In one or more examples, the user interaction analyzer 150 monitors the biometric metrics from the user 160 as the user 160 is interacting with the virtual reality system 100. For example, the user interaction analyzer 150 receives measurements from the biometric sensors described herein, such as the heartrate monitor, blood pressure monitor, thermometer, grip sensor, and other such sensors.

The user interaction analyzer 150 analyzes the biometric values to determine user cognition metrics during the presentation, as shown at 440. In one or more examples, the collected biometric values, and/or the results of the analysis are stored in the user profile 115, as shown at 450. For example, the user interaction analyzer 150 identifies one or more predetermined patterns in the biometric values, where each of the predetermined patterns indicate a specific cognition state or metric, such as an emotionally stressed condition, an agitated condition, a relaxed condition, and so on. The predetermined patterns can be specific to the user 160 based at least in part on the cognitive health of the user 160. For example, a user with a cognitive condition, such as a pre-Alzheimer's has a different predetermined pattern indicative of an emotionally stressed condition than another user without the pre-Alzheimer's condition.

It should be noted that memory is a form of "dimensionality reduction." Therefore, recasting based at least in part on sparse data provides a reduced visual representation of a memory, and presents opportunities for selecting dimensions for their therapeutic value. If aspects of the event are emphasized through the recast for therapeutic purposes, memories that are distorted and which overemphasize certain cognitive distortions can be disputed by the recast and thereby automatically "undistorted." In this way, using the technical features described herein, the virtual reality system 100 can emphasize other aspects of the sparse event data to assist with resolving the distortion that a user 160 can experience. Table 1 illustrates examples of cognitive distortions forming the basis of cognitive behavioral therapy, which can be addressed by memory recast.

The user interaction analyzer 150, in one or more examples, recognizes patterns in the sparse data previously associated by the user 160 with a specific cognitive condition. For example, as in Table 1, catastrophizing: a user expects to be fired for a minor mistake. Thus, in one or more examples, the sparse data associated with the distortion can be learned by the user 160 subjectively labeling the cognitive conditions in which s/he experienced each distortion. Such, identified events and corresponding biometric values are stored in the user profile 115. The user interaction analyzer is thus primed to take certain undistortion actions in creating a memory recast when a specific cognitive condition, such as a distortion condition is anticipated.

TABLE 1

Examples of cognitive distortions

| | |
|---|---|
| Catastrophizing | Thinking about worse situation possible without accounting for other possible outcomes. |
| Emotionalizing | Presuming that feelings are fact. |
| Polarization | All-or-nothing, dychotomic thinking - categorizing a situation using mutually exclusive categories rather than a continuum |
| Selective abstraction | Tunnel vision - ignoring aspects of the situation that do not fit the focus |
| Mental Reading | Presuming, without evidence, that one knows what other is thinking |
| Labeling | Putting a global, rigid label on oneself or another person |
| Minimization and/or maximization | Minimizing positive aspects and maximizing negative aspects of a situation/person |
| Imperatives | Interpreting on situation in view of how things should have been, rather than how they are |

In other words, the user interaction analyzer 150 identifies a cognitive condition of the user 160 based at least in part on the biometric values, facial expressions, and other such attributes associated with the event and historic labelled data for the user 160.

In one or more examples, the user interaction analyzer 150 measures cognitive ability and/or detects cognitive impairment or decline of the user 160. For example, techniques and tools can be used to diagnose (at least partially) or test susceptibility to cognitive impairments in children or in elderly people (such as cognitive impairments associated with Alzheimer's disease). The virtual reality system 100 can be used to evaluate treatment effects and/or measure cognitive decline over time.

In one or more examples, if the user interaction analyzer 150 estimates that the memory recast via the virtual world presenter 140 is causing the user 160 to become agitated or is non-productive, as could be the case for someone with pre-Alzheimer's or autism, then the memory recast can automatically terminate or change so that it is more productive and less agitating. Such therapy using memory recast can be an approach to help both traditional users and users suffering from a disability.

The user interaction analyzer 150 can send the request to the animator to edit the animation sequence based at least in part on the analysis of the biometric values, as shown at 440 and 450. If a request to edit the animation sequence is not received, the animator continues to playback the animation sequence until the selected events are replayed and memory recast for the user 160. If the request to edit the animation sequence is received, the animator 120 can facilitate selection of whether to edit the animation automatically, or based at least in part on manual input, as shown at 460.

For example, as described herein, the virtual reality system 100 can be used as a tool for behavior correction, career coaching, and the like. Thus, based at least in part on the cognitive state of the user 160 while watching the memory recast, and/or while the event was occurring, the user 160 can be suggested a different action, than the one s/he took in the event.

For example, if an automatic simulation option is chosen, the virtual reality system 100 generates a future-cast for the user 160, as shown at 462. The future-cast is a set of one or more animation sequences for the selected event, with one or more actions changed. For example, the virtual reality system 100 plays the same scene of a selected event for which the animation sequence is generated, with a different reaction from the user 160. For example, first, the original scene which caused emotional stress to the user 160 is memory recast. After that, the same scene is replayed, but at a moment identified by the virtual reality system 100 as a critical moment, the reaction of the user 160 is modified. The critical moment can be identified based at least in part on the biometric values of the user 160 varying or fluctuating above a predetermined threshold. The fluctuation can be determined based at least in part on statistics such as a moving average, a variation, a standard deviation, or the like. For example, if the heartrate of the user 160 changes from a steady 70 bpm to 110 bpm at a specific timestamp during the memory recast, the timestamp is noted as the critical moment to simulate a different reaction of the user 160. It should be noted that in one or more examples, the biometric values monitored are the biometric values captured during occurrence of the event, and stored in the recorded events repository 105. Alternatively, or in addition, in one or more examples, the biometric values monitored are the biometric values of the user while interacting with the memory recast via the virtual world presenter 140.

Alternatively, the virtual reality system 100 can be provided a specific reaction of the user manually, as shown at 464. For example, the animation sequence can convey recommendations for behavior correction, such as information, suggestions from a coach, or via crowd-sourcing or from artificial intelligence analysis. The user 160 and/or the coach can try to vary the outcome of the selected event by entering a different action for the avatar 165 of the user 160 than what is captured in the recorded event.

The virtual reality system 100, using the predictor 130 generates one or more different reactions from the participants based at least in part on the input action for the avatar 165. In one or more examples, the predictor 130 uses predictive model that is based at least in part on the cohort to which the user 160 belongs, such as autistic teenager, pre-Alzheimer's patients, engineers working on a specific project, middle school math teachers, and so on. For example, alteration of actions of the avatars and settings can be based at least in part on a predictive algorithm, which anticipate user's future actions relevant to current context. Algorithms such as noise-tolerant time-varying graph and the like can predict user's activities based at least in part on the actions/states of other users in their cohort, where the network can be defined by the different criteria based at least in part on the context.

Accordingly, the animator 120 generates an edited memory recast, which is an animation script for selected events using edited events in which the user 160, or more specifically, the avatar 165 of the user 160, reacts differently then what happened in reality, and the predictive model proceeds with different response of other participants, as shown at 470. The virtual reality system 100 displays the edited memory recast, as shown at 480.

In one or more examples, the virtual reality system 100 continues to monitor the user 160 for analyzing user cognition metrics during the edited memory casts, as shown at 440. The user 160 could practice different causes of actions until s/he is satisfied with the outcome.

In one or more examples, the virtual reality system 100 is used to provide behavioral correction support to the user 160. For example, the virtual reality system 100 identifies a cognitive distortion with the user 160 and initiates a memory recast or a future-cast to help the user 160 identify the cognitive distortion.

Figure 6:
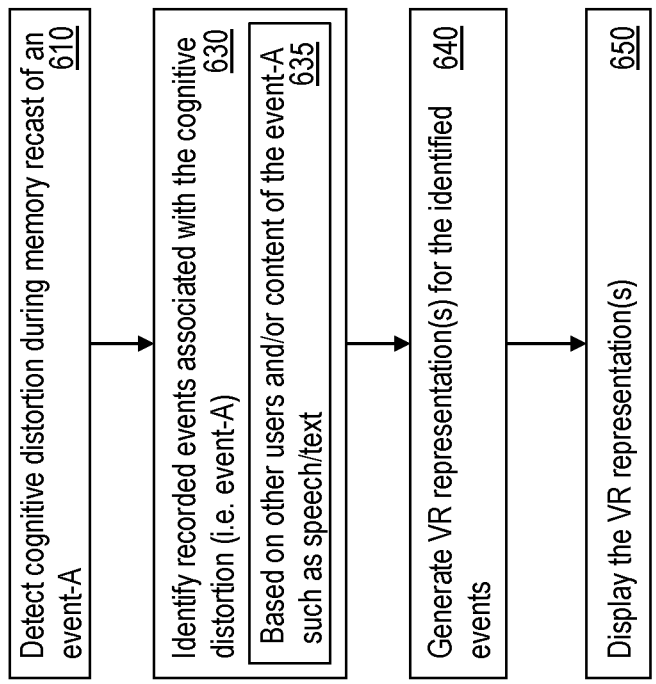
FIG. 6 illustrates a flowchart of an example method for providing cognitive distortion therapy via a virtual reality system, according to one or more embodiments of the invention.

FIG. 6 illustrates a flow chart of an example method for providing cognitive distortion therapy via the virtual reality system 100, according to one or more embodiments. As described herein, the virtual reality system 100 monitors and analyzes biometric measurements and other responses from the user 160. Based at least in part on the received inputs, the virtual reality system 100 detects a cognitive distortion that the user 160 is facing while watching a memory recast of an event, say event-A, via the virtual world presenter 140, as shown at 610. Alternatively, or in addition, the virtual reality system 100 receives an indication from the user 160 that s/he is facing a cognitive distortion. For example, the user 160 provides the indication via a user-interface, or by saying a predetermined phrase, such as the one or more examples in Table 1.

In response, the virtual reality system 100 identifies a subset of events from the recorded events 105 that are associated with the cognitive distortion, as shown at 630. For example, the subset of events includes events that have common attributes with the event-A, as shown at 635. For example, another event, say event-B, is identified as associated with the cognitive distortion if both event-A and event-B have a common set of actors involved. Alternatively, or in addition, the event-B can be associated with event-A if the content of the two events has an overlap. For example, if a specific word or phrase, such as 'project-A', 'person-X', or 'mistake', or any other such word or phrase is repeatedly used, above a predetermined threshold, in both events, the virtual reality system 100 can identify the two events as associated.

The virtual reality system 100 generates virtual reality representation(s), that is memory casts, for the identified events, as described herein, as shown at 640. The generated memory casts are then presented to the user 160 via the virtual world presenter 140, as shown at 650. In one or more examples, the memory casts are edited to generate future casts and/or simulations, as described herein (see FIG. 4).

For example, while the user 160 is watching a memory recast, the user interaction analyzer 150 recognizes a likely context for a catastrophizing distortion during a memory recast of when a mistake at work. A behavioral coach identifies that the likelihood of the catastrophic outcome is overestimated. Alternatively, or in addition, the virtual reality system 100 identifies the catastrophic distortion based at least in part on the user responses. Accordingly, the coach can request the virtual reality system 100 to, or the virtual reality system 100 can automatically select time spacing of rendered pieces of the memory recast to emphasize that a catastrophic outcomes' likelihood is overestimated. For example, the virtual reality system 100 immediately following the recast of the mistake identifies events of positive discussions with a manager at work when the mistake was discussed, and composes another memory recast for the positive event. The second memory recast is then replayed as a cognitive distortion reducing attempt, thus facilitating a behavioral correction.

Figure 7:
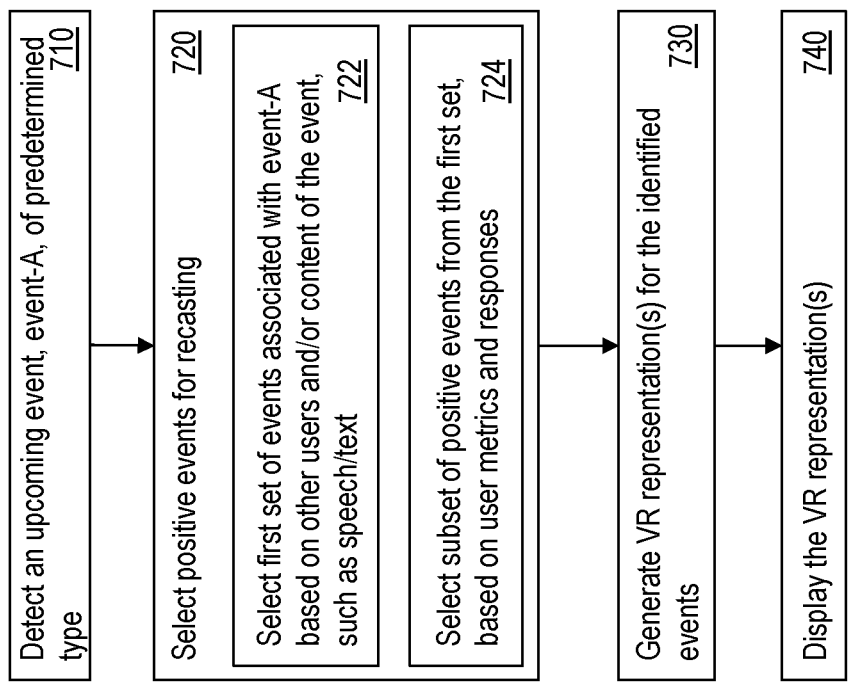
FIG. 7 illustrates a flowchart of an example method for providing behavioral correction by a virtual reality system, according to one or more embodiments of the invention.

FIG. 7 illustrates a flow chart of an example method for providing behavioral correction by the virtual reality system 100, according to one or more embodiments. For example, the virtual reality system 100 detects an upcoming event for the user, where the event is of a predetermined type of event that cause the user 160 a certain amount of stress, for example, a demo meeting, work review, etc., as shown at 710. The virtual reality system 100 detects the upcoming event based at least in part on the e-calendar of the user 160. In one or more examples, the virtual reality system 100 stores a list of the predetermined types of event that stress the user in the recorded events 105, or in another repository (not shown).

The virtual reality system 100 automatically selects events to recast that highlight "good" things relevant about the upcoming event, in the above example, the demo to the user 160, in order to amplify his feelings and boost his confidence about the upcoming demo, as shown at 720. For example, the virtual reality system 100 identifies the events that are related to the upcoming meeting based at least in part on the content of the events, for example, text, speech, meeting subject lines in the e-calendar, and so on, as shown at 722. The virtual reality system 100 further identifies a subset of these events at which the user 160 was not stressed, based at least in part on the user's biometric values, facial expressions, gestures, and other factors, during the events, as shown at 724. The virtual reality system 100 further generates memory recasts for the selected non-stressful events and plays the memory recasts for the user 160 to view, as shown at 730 and 740.

The technical features described herein provide a virtual reality system for memory recasting and further for therapeutic uses. For example, memory recasting is used for self-help, therapy, learning, recollection and drilling, reliving useful or happy experiences, etc. Further, the virtual reality system facilitates using deep learning techniques to uncover relationships between recast elements/events in the context of therapeutic methods. For example, the virtual reality system selects memory-related dimensions for their therapeutic value and/or employs a user-specific cognitive distortion reduction.

For example, the virtual reality system receives and/or accesses sparse information relating to a user's life events for a period of time in the past (e.g. previous 24 hours). The technical features herein facilitate converting such captured event information into an animated virtual reality (VR) representation (e.g. avatars of user and colleagues interacting). The sparse information that is used to create a generative model to create the VR representation (a.k.a. life rollback puppet show or memory recast), takes into consideration a user cohort (e.g. autism, pre-Alzheimer's, schizophrenia, etc.) and risk-value associated with the sparsity of the information. The information collected can include measurements and/or other data captured by event recorders, such as pulse measuring device, electronic calendar, head-mounted display (e.g. video), chats/emails, biometric devices, cameras, microphones, smartphone information and sensors, geolocation devices, etc.

In one or more examples, the VR representation (memory recast) is presented to the user in an edited form, for example by removing one or more actions from, or adding one or more simulated actions to the event. The generated memory recast can be stored for later access. The memory recasts can be displayed in as sorted list according to an estimated emotional level of user, estimated emotional value to a user, estimated educational value to a user, the setting of the user in the past, the time of past events, people interacted with in the past sequence, etc. The virtual reality system can estimate such values for the memory recasts based at least in part on the user's biometric values, facial expressions, and word choices. Alternatively, or in addition, the virtual reality system receives these estimates from the user and/or a coach, or some other user.

The access to the memory recast is controlled (including control during a person's life or after death).

In one or more examples, the VR representation conveys recommendations for behavioral changes, or corrections/improvement. For example, the recommendations can be received as a crowd-sourced input, from AI analysis, or from a designated coach to help the user improve in certain scenarios. For example, the recommendations can be conveyed in the form of a simulation of events by generating a future recast using a predictive model.

The virtual reality system facilitates the user to control a degree of realism for the VR representation. Alternatively, or in addition, the virtual reality system facilitates controlling viewpoints of the VR representation playback, by any of: the user, a therapist, a teacher, a manager, a healthcare professional, etc.

In one or more examples, a pseudo-sentient puppeteer (e.g. AI agent) can be used to control the user avatar or other avatars to emphasize points, increase or decrease realism, explore alternate scenarios, etc.

The technical features further facilitate predictive analytics to identify events for future forecast that can amplify a user's behavioral traits and/or confidence. For example, alteration of avatars and settings can be based at least in part on the predictive algorithms, which anticipate user's future actions relevant to current context. Algorithms such as noise-tolerant time-varying graph can predict user's activities based at least in part on the actions/states of other users in the user's cohort. For example, if the system detects the upcoming demo meeting for a user, and knows that this causes him/her a certain amount of stress, it can opt to recast all the "good" events relevant about the demo to the user, in order to amplify his feelings and boost his confidence about the upcoming demo. The "good" events can be identified based at least in part on the user's biometric measurements, facial expressions, word choice, and other such factors stored in the captured information for the events. Thus, the technical features use the predictive analytics to anticipate and recast future events, based at least in part on user context, cognitive state and activities in the user's cohort. Such future forecast and recasts are based at least in part on events selected to facilitate therapeutic effect.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for generating a virtual reality (VR) memory recast, the method comprising:
    selecting an event from a plurality of recorded events to animate wherein the event is selected from the plurality of recorded events based at least in part on an upcoming event identified from an e-calendar, the event that is selected being of a predetermined type that matches with the upcoming event;
    generating an animation script based at least in part on captured information of the event;
    editing the animation script by adding a simulated interaction in the animation script; and
    displaying a virtual reality representation of the animation script of the event that is selected as preparation for the upcoming event by using predictive algorithms and subsets of a positive event recasting based on user metrics and response.

2. The computer implemented method of claim 1, further comprising:
    recording the event in the plurality of recorded events, the recording comprising:
        monitoring a user attribute; and
        in response to the user attribute matching a predetermined criteria, storing the captured information from one or more event recorders for the event.

3. The computer implemented method of claim 2, wherein the user attribute is at least one from a group consisting of heartrate, blood-pressure, temperature, facial expression, word choice.

4. The computer implemented method of claim 2, wherein the captured information comprises at least one of a location, an image of surroundings, a user-biometric measurement, a user-facial-expression, a user-gesture, and a user-speech data.

5. The computer implemented method of claim 1, wherein generating the animation script further comprises:
    creating a virtual world based at least in part on location associated with the event;
    creating an avatar that navigates the virtual world, the avatar based at least in part on a user-profile; and
    animating the avatar according to one or more actions during the event.

6. The computer implemented method of claim 1, further comprising:
    monitoring user attributes during playback of the virtual reality representation; and
    determining a cognitive distortion based at least in part on the user attributes.

7. The computer implemented method of claim 6, wherein the event is a first event, and the method further comprises:
    selecting a second event from the plurality of recorded events to animate, in response to detecting the cognitive distortion.

8. A virtual reality system comprising:
    an events repository that comprises a captured information corresponding to a plurality of recorded events;
    an animator configured to:
        select an event from the events repository for animating, wherein the event is selected from the plurality of recorded events based at least in part on an upcoming event identified from an e-calendar, the event that is selected being of a predetermined type that matches with the upcoming event;
        generate an animation script based at least in part on captured information of the event;
    a predictor configured to simulate an interaction to be added to the animation script;
    the animator further configured to edit the animation script by adding the simulated interaction; and a virtual world presenter configured to display a virtual reality representation of the animation script as preparation for the upcoming event by using predictive algorithms and subsets of a positive event recasting based on user metrics and response.

9. The virtual reality system of claim 8, further comprising one or more event records configured to:
   record the event in the events repository, the recording comprising:
      monitoring a user attribute; and
      in response to the user attribute matching a predetermined criteria, storing the captured information from the one or more event recorders for the event.

10. The virtual reality system of claim 9, wherein the user attribute is at least one from a group consisting of heartrate, blood-pressure, temperature, facial expression, word choice.

11. The virtual reality system of claim 9, wherein the captured information comprises at least one of a location, an image of surroundings, a user-biometric measurement, a user-facial-expression, a user-gesture, and a user-speech data.

12. The virtual reality system of claim 8, wherein for generating the animation script, the animator is further configured to:
   create a virtual world based at least in part on location associated with the event;
   create an avatar that navigates the virtual world, the avatar based at least in part on a user-profile; and
   animate the avatar according to one or more actions during the event.

13. The virtual reality system of claim 8, further comprising a user-interaction analyzer configured to:
   monitor user attributes during playback of the virtual reality representation; and
   determine a cognitive distortion based at least in part on the user attributes.

14. The virtual reality system of claim 13, wherein the event is a first event, and the user-interaction analyzer is further configured to:
   select a second event from the plurality of recorded events to animate, in response to detecting the cognitive distortion.

15. A computer program product for a virtual reality system, the computer program product comprising a computer readable storage medium having program instructions embodied therewith, the program instructions executable by a processing circuit to cause the processing circuit to:
   select an event from an events repository for animating, wherein the event is selected from a plurality of recorded events based at least in part on an upcoming event identified from an e-calendar, the event that is selected being of a predetermined type that matches with the upcoming event;
   generate an animation script based at least in part on captured information of the event;
   simulate an interaction to be added to the animation script;
   edit the animation script by adding the simulated interaction; and
   display a virtual reality representation of the animation script as preparation for the upcoming event by using predictive algorithms and subsets of a positive event recasting based on user metrics and response.

16. The computer program product of claim 15, wherein the program instructions further cause the processing circuit to:
   recording the event in the events repository, the recording comprising:
      monitoring a user attribute; and
      in response to the user attribute matching a predetermined criteria, storing the captured information from one or more event recorders for the event.

17. The computer program product of claim 15, wherein generation of the animation script further comprises:
   creating a virtual world based at least in part on location associated with the event;
   creating an avatar that navigates the virtual world, the avatar based at least in part on a user-profile; and
   animating the avatar according to one or more actions during the event.

18. The computer program product of claim 15, wherein the program instructions further cause the processing circuit to:
   monitor user attributes during playback of the virtual reality representation; and
   determine a cognitive distortion based at least in part on the user attributes.

* * * * *